US012733088B2

(12) United States Patent
Scherlag et al.

(10) Patent No.: US 12,733,088 B2
(45) Date of Patent: Sep. 8, 2026

(54) NON-THERMAL HYBRID-PLASMA AND METHODS OF PRODUCTION AND USE THEREOF

(71) Applicant: The Board of Regents of the University of Oklahoma, Norman, OK (US)

(72) Inventors: Benjamin Scherlag, Oklahoma City, OK (US); Ronald A. Scherlag, Edmond, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 987 days.

(21) Appl. No.: 17/741,835

(22) Filed: May 11, 2022

(65) Prior Publication Data

US 2022/0386442 A1 Dec. 1, 2022

Related U.S. Application Data

(60) Provisional application No. 63/193,882, filed on May 27, 2021.

(51) Int. Cl.
*H05H 1/24* (2006.01)

(52) U.S. Cl.
CPC .................................... *H05H 1/24* (2013.01)

(58) Field of Classification Search
CPC ......... H05H 1/24; H05H 2245/20; A61N 1/44
See application file for complete search history.

(56) References Cited

U.S. PATENT DOCUMENTS

2010/0233328 A1* 9/2010 Ferrell .................... A23B 2/92
426/106

FOREIGN PATENT DOCUMENTS

| | | | | | |
|---|---|---|---|---|---|
| CN | 111268763 A | * | 6/2020 | ................ | C02F 1/30 |
| WO | WO-0179856 A2 | * | 10/2001 | ........... | G01N 35/028 |
| WO | WO-2015184252 A1 | * | 12/2015 | ............... | C25B 1/04 |

* cited by examiner

*Primary Examiner* — Robert H Kim
(74) *Attorney, Agent, or Firm* — Dunlap Codding, P.C.

(57) ABSTRACT

Compositions, kits, systems, and methods are disclosed for production and use of a non-thermal hybrid-plasma.

18 Claims, 14 Drawing Sheets
(14 of 14 Drawing Sheet(s) Filed in Color)

A B

B

A

NON-THERMAL HYBRID-PLASMA AND METHODS OF PRODUCTION AND USE THEREOF

CROSS REFERENCE TO RELATED APPLICATIONS/INCORPORATION BY REFERENCE STATEMENT

The present application claims the benefit under 35 USC § 119(e) of U.S. Provisional Patent Application Ser. No. 63/193,882 filed May 27, 2021. The entire contents of the above-referenced patent application(s) are hereby expressly incorporated herein by reference.

STATEMENT REGARDING FEDERALLY SPONSORED RESEARCH OR DEVELOPMENT

Not Applicable.

BACKGROUND

There are four fundamental states of matter: solid, liquid, gas, and plasma. When a solid is heated, it transforms into a liquid, and a heated liquid subsequently transforms into a gas. If a gas is subjected to enough energy/high stress, it becomes an ionized gas known as plasma. Plasma contains reactive chemical species such as positively charged atomic and molecular ions, freed electrons, and neutral atoms.

Early applications of plasma technology mainly focused on the field of engineering, such as nuclear fusion and plasma etching. However, over the past 20 years, there has been a plethora of studies describing the microbicidal properties of plasma. Recently accumulated knowledge has led to improvements in the efficiency of disinfection and sterilization methods using plasma technology (Sakudo et al. (2019) *Int J Mol Sci.,* 20(20): 5216).

There are two types of plasma: thermal plasma (also referred to as high temperature plasma) and non-thermal plasma (also referred to as cold plasma or non-equilibrium plasma). Thermal plasma is nearly fully ionized, while non-thermal plasma is only partly ionized. Thermal plasmas are in thermal equilibrium, where the electrons and the heavy particles are at the same, high temperature; as such, the extreme temperature of thermal plasma prevents its use in treatment of heat sensitive materials/surfaces and living organisms.

In contrast, since non-thermal plasma is only partly ionized, the positive ions and neutral molecules are at a much lower temperature (i.e., ambient temperature) than the more energetic electrons. As a result, non-thermal plasma usually can operate at less than about 104° F. (about 40° C.) at the point of contact.

Thermal plasma can be produced naturally (i.e., astrophysical, lightning, polar aurorae, etc.) at extremely high temperature, and can be produced by various external power sources (i.e., fusion, electric arc welding, lasers, dielectric and corona discharge, etc.); in contrast, non-thermal plasma is exclusively generated by application of an external power source to a gas or liquid (Weltmann et al. (2018) *Plasma Processes and Polymers,* 16:1612-8850). Artificial plasmas can be produced by various means, including dielectric barrier discharge, corona discharge, radio frequency energy, microwave frequencies, high voltage AC, or DC electric current as in electrolysis (Kong et al. (2009) *New Journal of Physics,* 11:1159-1202). Plasma properties have been promoted for scientific, medical, and an array of commercial applications (Kong et al., supra; and Hendricks et al. (2013) "Five Industries Using Plasma," Cable Technology Featured Article). Gasification of waste has even been proposed as a substitute for landfills and incineration (Fabry et al. (2010) *Waste and Biomass Valorization,* 3:421-439). However, the promise and possibilities of plasma applications have, up to the present, been limited due to the high energy input required for generation and the transient nature of the generated plasma (seconds to minutes at the very most).

There are three types of methods that have been described commercially (ESPEC NORTH AMERICA, Inc., Denver CO) for developing a humidity chamber. Type 1 is a Steam Generator, which uses an immersion heater to heat water to produce steam. Type 2 is an Atomizer, in which atomized water from a fine spray nozzle is passed by a chamber heater. Type 3 is a Water Bath, which utilizes a small bath enclosed in a mixing tank; as the chamber air is drawn into the mixing tank, it passes the heated water bath and picks up vapor.

However, all three of these types of humidity chambers rely on an external energy source. In addition, any plasma generated in these humidity chambers requires energy input, is short acting, and cannot be accumulated.

In particular, current methods for non-thermal plasma induction almost exclusively rely on the application of external energy, usually in the form of electrical discharges, applied to a gas. However, non-thermal plasma produced by these methods is short lived, with a life span of only seconds, and therefore cannot be harvested in sufficient volumes, stored for extended periods of time, or studied to identify potential applications thereof.

Therefore, there is a need in the art for new and improved devices and methods to produce a stable source of non-thermal plasma that overcome the disadvantages and defects of the prior art. It is to such compositions and methods that the present disclosure is directed.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

Figure 1:
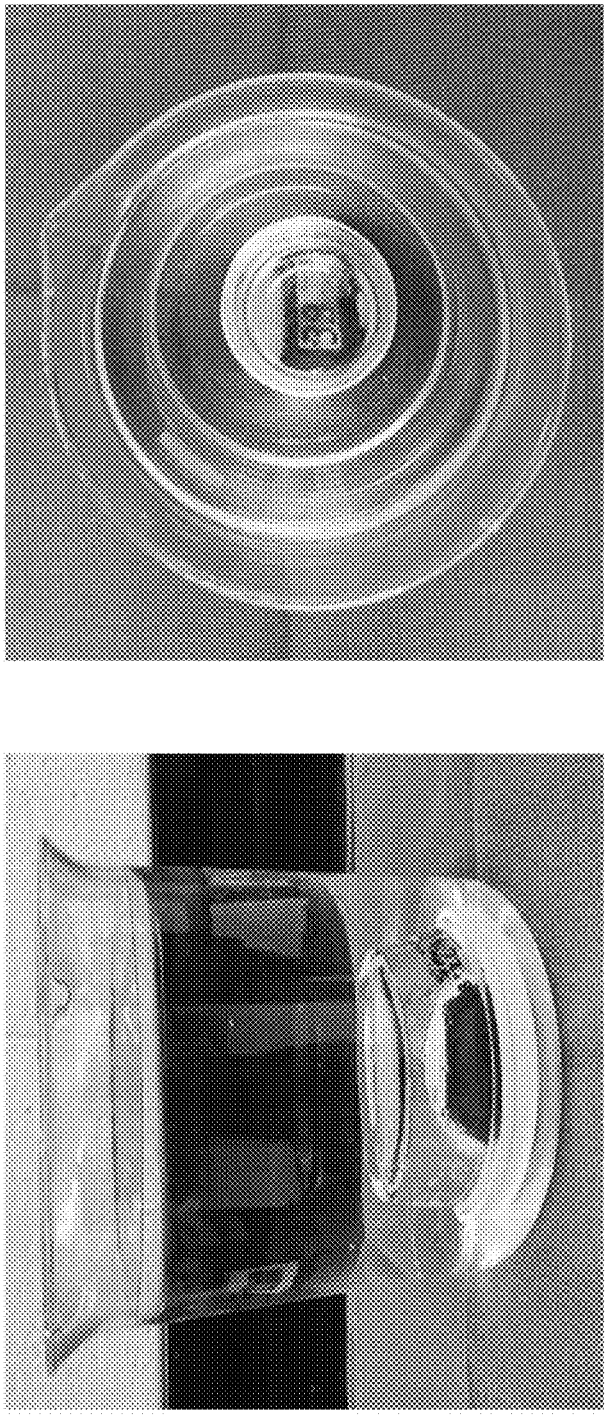
FIG. 1 contains photographs of one non-limiting embodiment of a hybrid-plasma-generating chamber constructed in accordance with the present disclosure. (A) 2000 ml beaker containing distilled water, and sealed air chamber in inverted glass jar at the bottom of the beaker with an enclosed hygrometer and (B) view from the top of the beaker looking at the hygrometer through the bottom of the glass jar.

The embodiments of the present disclosure are not limited to the details of construction and the arrangement of the components set forth in the following description and are capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in the present disclosure shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the laboratory procedures and techniques of, analytical chemistry, synthetic organic chemistry, cell and tissue culture, molecular biology, and protein and oligo- or polynucleotide chemistry, and medicinal and pharmaceutical chemistry described herein are those well-known and commonly used in the art. Standard techniques are used for recombinant DNA, oligonucleotide synthesis, and tissue culture and transformation (e.g., electroporation, lipofection). Enzymatic reactions and purification techniques are performed according to manufacturer's specifications or as commonly accomplished in the art or as described herein. The foregoing techniques and procedures are generally performed according to conventional methods well known in the art and as described in various general and more specific references that are cited and discussed throughout the present specification.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

While the compositions and methods of the present disclosure have been described in terms of particular embodiments, it will be apparent to those of skill in the art that variations, substitutions, and modifications may be applied to the compositions and/or methods and in the steps or in the sequence of steps of the methods described herein without departing from the spirit and scope of the inventive concepts disclosed herein, for example as defined in, but not limited to, the appended claims, which are presented herein as exemplary only.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the terms "about" and "approximately" are used to indicate that a value includes the inherent variation of error for a composition/apparatus/device, the method being employed to determine the value, or the variation that exists among the study subjects. For example, but not by way of limitation, when the term "about" or "approximately" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. For example, the term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrases "associated with" and "coupled to" include both direct association/binding of two moieties to one another as well as indirect association/binding of two moieties to one another. Non-limiting examples of associations/couplings include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety, for example.

As used herein, "substantially pure" means an object species is the predominant species present (i.e., on a molar basis it is more abundant than any other individual species in the composition), and preferably a substantially purified fraction is a composition wherein the object species comprises at least about 50 percent (on a molar basis) of all macromolecular species present. Generally, a substantially pure composition will comprise more than about 80 percent of all macromolecular species present in the composition, more preferably more than about 85%, 90%, 95%, and 99%. Most preferably, the object species is purified to essential homogeneity (contaminant species cannot be detected in the composition by conventional detection methods) wherein the composition consists essentially of a single macromolecular species.

The term "pharmaceutically acceptable" refers to compounds and compositions which are suitable for administration to humans and/or animals without undue adverse side effects such as toxicity, irritation and/or allergic response commensurate with a reasonable benefit/risk ratio.

By "biologically active" is meant the ability to modify the physiological system of an organism without reference to how the active agent has its physiological effects.

The terms "subject" and "patient" are used interchangeably herein and will be understood to refer to a warm-blooded animal, particularly a mammal. Non-limiting examples of animals within the scope and meaning of this term include dogs, cats, rabbits, rats, mice, guinea pigs, chinchillas, hamsters, ferrets, horses, pigs, goats, cattle, sheep, zoo animals, camels, llamas, non-human primates, including Old and New World monkeys and non-human primates (e.g., cynomolgus macaques, chimpanzees, rhesus monkeys, orangutans, and baboons), and humans.

"Treatment" refers to therapeutic treatments. "Prevention" refers to prophylactic or preventative treatment measures. The term "treating" refers to administering the composition to a patient for therapeutic purposes.

The terms "therapeutic composition" and "pharmaceutical composition" refer to an active agent-containing composition that may be administered to a subject by any method known in the art or otherwise contemplated herein, wherein administration of the composition brings about a therapeutic effect as described elsewhere herein.

The term "effective amount" refers to an amount of an active agent which is sufficient to exhibit a detectable therapeutic effect without excessive adverse side effects (such as toxicity, irritation, and allergic response) commensurate with a reasonable benefit/risk ratio when used in the manner of the inventive concepts. The effective amount for a patient will depend upon the type of patient, the patient's size and health, the nature and severity of the condition to be treated, the method of administration, the duration of treatment, the nature of concurrent therapy (if any), the specific formulations employed, and the like.

The term "ameliorate" means a detectable or measurable improvement in a subject's condition, disease, or symptom thereof. A detectable or measurable improvement includes a subjective or objective decrease, reduction, inhibition, suppression, limit, or control in the occurrence, frequency, severity, progression, or duration of the condition or disease, or an improvement in a symptom or an underlying cause or a consequence of the disease, or a reversal of the disease. A successful treatment outcome can lead to a "therapeutic effect" or "benefit" of ameliorating, decreasing, reducing, inhibiting, suppressing, limiting, controlling, or preventing the occurrence, frequency, severity, progression, or duration of a disease or condition, or consequences of the disease or condition in a subject.

A decrease or reduction in worsening, such as stabilizing the condition or disease, is also a successful treatment outcome. A therapeutic benefit therefore need not be complete ablation or reversal of the disease or condition, or any one, most or all adverse symptoms, complications, consequences, or underlying causes associated with the disease or condition. Thus, a satisfactory endpoint may be achieved when there is an incremental improvement such as a partial decrease, reduction, inhibition, suppression, limit, control, or prevention in the occurrence, frequency, severity, progression, or duration, or inhibition or reversal of the condition or disease (e.g., stabilizing), over a short or long duration of time (hours, days, weeks, months, etc.). Effectiveness of a method or use, such as a treatment that provides a potential therapeutic benefit or improvement of a condition or disease, can be ascertained by various methods and testing assays.

Turning now to the inventive concepts, compositions, kits, devices, and methods are disclosed that utilize high humidity derived from passive processes (i.e., no external energy input) to produce a reliable source of a new, non-thermal plasma which is stable enough for multiple applications, including (but not limited to) scientific, medical, commercial, and environmental applications. Until the present disclosure, non-thermal plasmas could only be produced using various forms of electrical energy.

As described in the Examples, it is demonstrated therein that a high concentration gradient of free water molecules (2.7 Å in size) in a large amount of bulk water can cross a glass barrier (pore size 8-10 Å) so that humidity within a sealed glass jar will progressively increase to a maximum value, even though it is filled with air. When the jars were removed from the water the humidity in air remained at maximum values for more than two weeks. The gas present in the jar was identified as a non-thermal plasma, which previously had only been produced by high energy input (e.g., electrolysis) and which previously was only sustained for milliseconds. This new form of non-thermal plasma produced without external energy input is referred to herein as "non-thermal hybrid-plasma." The non-thermal hybrid-plasma can be harvested and accumulated in large volumes and has been demonstrated herein to possess (for example, but not by way of limitation) anti-aging, anti-oxidant, anti-dehydration, anti-microbial, and preservative properties.

In particular, the non-thermal hybrid-plasmas generated in accordance with the present disclosure can be utilized in various applications, including (but not limited to): biomedicine (such as, but not limited to, inactivation of pathogens, wound treatment, cancer treatment, etc.); material science (such as, but not limited to, surface treatments, decontamination, computer chip etching, etc.); and food production (such as, but not limited to, food safety, food preservation, food storage, etc.).

Certain non-limiting embodiments of the present disclosure are directed to a generator that produces a non-thermal hybrid-plasma. The generator includes a sealed glass container having a first end, a second end, a sidewall, and a receiving space, and ambient air is sealed within the receiving space of the sealed glass container. The generator also includes a second container in which the sealed glass container is placed. The second container has a first end, a second end, and a receiving space having a volume that is sufficiently larger than the sealed glass container. The generator further includes water disposed in the second container in a sufficient volume to surround at least a portion of the sidewall of the sealed glass container. Non-thermal hybrid-plasma is generated within the sealed glass container.

The generator further requires that (i) the second container is sealed, or (ii) the sealed glass container is submerged in the water. When the second container is sealed, the water disposed in the second container may surround a portion (or all) of the sidewall of the sealed glass container; alternatively, the water may not substantially contact the sealed glass container. When the sealed glass container is submerged in the water, the first end of the sealed glass container is placed upon a closed first end of the second container, and the water is disposed in the second container in a sufficient volume to surround and cover the sidewall and second end of the sealed glass container.

The glass container may be sealed by any methods known in the art or otherwise contemplated herein. For example (but not by way of limitation), the first or second end of the glass container may be sealed using a lid. Alternatively, one of the ends of the glass container may be sealed by placement or attachment of that end of the sealed glass container upon a closed lower end of the second container.

When a lid is utilized, the lid should be formed of a non-metallic material, such as glass and/or plastic.

The second container may be formed of any material that allows the generator to function in accordance with the present disclosure so that non-thermal hybrid-plasma generated. Non-limiting examples of materials from which the second container can be constructed include glass and/or plastic.

Certain non-limiting embodiments of the present disclosure are directed to a chamber that produces the non-thermal hybrid-plasma of the present disclosure. The chamber includes a sealed glass container having a first end, a second end, a sidewall, and a receiving space; water sealed within at least a portion of the receiving space of the sealed glass container; and a second sealed container in which the sealed glass container is placed. The second container has a first end, a second end, and a receiving space having a volume that is sufficiently larger than the sealed glass container. In this manner, a non-thermal hybrid-plasma is generated within the second sealed container.

The second container may be formed of any material that allows the generator to function in accordance with the present disclosure so that non-thermal hybrid-plasma generated. Non-limiting examples of materials from which the second container can be constructed include glass and/or plastic.

Certain non-limiting embodiments of the present disclosure are directed to a method of disposing at least one item in any of the non-thermal hybrid-plasma-generating chambers disclosed or otherwise contemplated herein.

Certain non-limiting embodiments of the present disclosure are directed to a method of generating a non-thermal hybrid-plasma. The method comprises the steps of: (a) sealing ambient air within a glass container having a first end, a second end, a sidewall, and a receiving space, wherein ambient air is sealed within the receiving space of the glass container; (b) placing the sealed glass container within a receiving space of a second container, wherein the receiving space of the second container has a volume that is sufficiently larger than the sealed glass container; (c) performing a step selected from: (i) filling at least a portion of the receiving space of the second container with water and sealing the second container, or (ii) filling at least a portion of the receiving space of the second container with a sufficient volume of water so as to surround and cover the sealed glass container; and (d) incubating the sealed glass container within the water-filled second container for a period of time sufficient to generate the non-thermal hybrid-plasma within the sealed glass container.

When the second container is sealed in step (c)(i), the water disposed in the second container may surround a portion (or all) of the sidewall of the sealed glass container; alternatively, the water may not substantially contact the sealed glass container.

The glass container may be sealed by any methods known in the art. For example (but not by way of limitation) in step (a), the first or second end of the glass container is formed by sealing the glass container with a lid. Alternatively, steps (a) and (b) are performed simultaneously such that the glass container is sealed by placement or attachment of the open first end of the sealed glass container upon a closed second end of the second container.

When a lid is utilized, the lid may be formed of a non-metallic material, such as glass and/or plastic.

The second container may be formed of any material that allows the generator to function in accordance with the present disclosure so that non-thermal hybrid-plasma generated.

Non-limiting examples of materials from which the second container can be constructed include glass and/or plastic.

In certain particular (but non-limiting) embodiments, the method may further include one or more additional steps. Non-limiting examples of steps that may be utilized include: (e) removing the sealed glass container from the second container; (f) storing the sealed glass container for a period of time; and/or (g) recovering the non-thermal hybrid-plasma.

Certain non-limiting embodiments of the present disclosure are directed to another method of generating a non-thermal hybrid-plasma, wherein the method comprises the steps of: (a) filling at least a portion of a receiving space of a glass container with water; (b) sealing the water within the glass container to form a sealed glass container; (c) placing the sealed glass container within a receiving space of a second container, wherein the receiving space has a volume that is sufficiently larger than the sealed glass container; (d) sealing the second container having the sealed glass container therewithin; and (e) incubating the water-filled, sealed glass container within the sealed second container for a period of time sufficient to generate the non-thermal hybrid-plasma within the second sealed container.

In certain particular (but non-limiting) embodiments, the method may further include one or more additional steps, such as (but not limited to): (f) recovering the non-thermal hybrid-plasma.

The second container may be formed of any material that allows the generator to function in accordance with the present disclosure so that non-thermal hybrid-plasma generated. Non-limiting examples of materials from which the second container can be constructed include glass and/or plastic.

Certain non-limiting embodiments of the present disclosure are directed to a non-thermal hybrid-plasma produced by any of the methods disclosed or otherwise contemplated herein.

Certain non-limiting embodiments of the present disclosure are directed to a method of growing a plant that includes the step of exposing the plant to any of the non-thermal hybrid-plasmas disclosed or otherwise contemplated herein.

In a particular (but non-limiting) embodiment, the plant is exposed to the non-thermal hybrid-plasma in the absence of soil and/or water.

Certain non-limiting embodiments of the present disclosure are directed to a method of treating a comestible that includes the step of exposing the comestible to any of the non-thermal hybrid-plasmas disclosed or otherwise contemplated herein.

In a particular (but non-limiting) embodiment, the comestible is exposed to the non-thermal hybrid-plasma in the absence of refrigeration.

Certain non-limiting embodiments of the present disclosure are directed to a method of treating a surface that includes contacting the surface with any of the non-thermal hybrid-plasmas disclosed or otherwise contemplated herein.

In a particular (but non-limiting) embodiment, the contact occurs for the purpose of disinfecting or decontaminating the surface. In another particular (but non-limiting) embodiment, the contact occurs for the purpose of etching a surface, such as (but not limited to), a computer chip.

Certain non-limiting embodiments of the present disclosure are directed to a method of administering a pharmaceutical composition to a patient in need thereof, wherein the pharmaceutical composition comprises any of the non-thermal hybrid-plasmas disclosed or otherwise contemplated herein.

This administration may be performed based upon any of the activities disclosed or otherwise contemplated herein for the non-thermal hybrid-plasmas of the present disclosure. For example (but not by way of limitation), the pharmaceutical composition may be administered to treat a microbial infection (such as, but not limited to, a SARS-CoV-2 infection), to treat a wound, to treat a cancer, to disinfect a surface of the patient to which the pharmaceutical composition is administered (i.e., topical application of the composition to the skin), and the like.

The pharmaceutical compositions of the present disclosure may be administered alone or in combination (either simultaneously or wholly or partially sequentially) with one or more additional active agents. For example (but not by way of limitation), when the pharmaceutical composition is administered to treat a microbial infection, one or more additional antimicrobial substances may also be administered, and when the pharmaceutical composition is administered to treat cancer, one or more anti-cancer agents may also be administered. The combinatorial administration of the pharmaceutical compositions of the present disclosure with one or more active agents may provide a synergistic effect in the treatment of one or more conditions.

The pharmaceutical compositions of the present disclosure may be administered by any methods known in the art or otherwise contemplated herein. For example (but not by way of limitation), the pharmaceutical compositions may be formulated for inhalation, formulated as a spray or in one or more encapsulated forms, or formulated for delivery through a device (i.e., catheter, stent, or other intraluminal device), or the like.

EXAMPLES

Examples are provided hereinbelow. However, the present disclosure is to be understood to not be limited in its application to the specific experimentation, results, and laboratory procedures disclosed herein. Rather, the Examples are simply provided as one of various embodiments and is meant to be exemplary, not exhaustive.

Example 1

This Example demonstrates the construction of a non-thermal hybrid-plasma generating device in accordance with the present disclosure.

Thermal plasma can naturally exist in the sun at extremely high temperature, whereas non-thermal plasma is exclusively generated by application of an external power source to a gas or liquid (Weltmann et al. (2018) *Plasma Processes and Polymers,* 16:1612-8850). Plasmas can be produced by various means, including radio frequency energy, microwave frequencies, high voltage AC, or DC electric current as in electrolysis (Kong et al. (2009) *New Journal of Physics,* 11:1159-1202). Plasma properties have been promoted for scientific, medical, and an array of commercial applications (Kong et al., supra; and Hendricks et al. (2013) "Five Industries Using Plasma," Cable Technology Featured Article). Gasification of waste has even been proposed as a substitute for landfills and incineration (Fabry et al. (2010) *Waste and Biomass Valorization,* 3:421-439). However, the promise and possibilities of plasma applications have, up to the present, limited its use due to the high energy input required for generation and the transient nature of the generated plasma. The present disclosure provides for the generation and accumulation of relatively large amounts of stable plasma using natural processes such as osmosis and diffusion instead of high energy sources.

The size of a water molecule is 2.7 Å, whereas the pore diameters of various types of glass range from 8-10 Å. Thus, from a theoretical standpoint, a water molecule should be able to pass through a glass pore. Spectral analysis has shown that 12-19% of bulk water exists as free water molecules (Penkov et al. (2013) *Biophysics,* 58:739-742). This Example demonstrates that an initial concentration gradient of free water molecules across a glass barrier along with hydrostatic pressure will force free water molecules through the pores in the glass jar until the concentration gradient is equal on both sides of the glass. When liberated and confined, these highly kinetic molecules react to form a novel mixture of water and gas, referred to herein as a non-thermal "hybrid-plasma."

In this Example, sensitive hygrometers (Roff C. Hagen Corp., Mansfield, MA) were placed within glass jars with tight-fitting plastic lids, so that the hygrometer showed ambient humidity of the enclosed air. The glass jars were fixed (using Velcro) in an inverted orientation to the bottom of a large glass beaker or a large acrylic container to prevent floating. Because the jars were inverted, the hygrometer readings could be viewed through the bottom of the jars when underwater.

Distilled water was then poured to fill the beaker/container (approximately 2000-4000 ml), with the inverted glass jar attached to the bottom of the filled container (FIG. 1). All tests were conducted at room temperature between 68° F.-72° F. Also during these experiments, latex gloves were worn during handling of the glass jars, and the jars were kept clean and wiped with alcohol to remove any skin oils or film that might block pores of the glass jars.

In a first series of experiments using a 2000 ml beaker (n=10), as shown in FIG. 1, the humidity was determined every hour for 4 hours. In Table 1, the hour-by-hour changes in humidity were compared to the baseline values. It was found that the humidity levels progressively increased to the maximum value of 99% in all jars. Two experiments reached 99% humidity within two hours, and all ten experiments reached 99% humidity by the 4th hour.

TABLE 1

Measurement of Humidity in a Dry Container Immersed in Water

| Expt # | Baseline | Hour 1 | Hour 2 | Hour 3 | Hour 4 | |
|---|---|---|---|---|---|---|
| 1 | 44 | 81 | 91 | 97 | 99 | |
| 2 | 47 | 88 | 99 | 99 | 99 | |
| 3 | 45 | 86 | 97 | 99 | 99 | |
| 4 | 44 | 82 | 93 | 98 | 99 | |
| 5 | 46 | 88 | 99 | 99 | 99 | |
| 6 | 45 | 87 | 96 | 99 | 99 | |
| 7 | 39 | 75 | 87 | 94 | 99 | |
| 8 | 47 | 78 | 87 | 95 | 99 | |
| 9 | 46 | 87 | 98 | 99 | 99 | |
| 10 | 44 | 83 | 94 | 97 | 99 | |
| Average | 45 | 84 | 94 | 98 | 99 | |
| SD | 2.3 | 4.5 | 4.6 | 1.8 | 0 | |
| p-value | | <0.05 | <0.05 | <0.05 | <0.05 | Compared to Baseline |
| | | | <0.05 | 0.004 | 0.04 | Compared to previous hour |

At the end of 4 hours, the jars were removed from the water, the outside dried, and placed on a shelf at room temperature for a period of time. The maximum humidity (99%) within the jars remained unchanged for more than 30 days. This behavior indicated the presence of plasma, a second form of gaseous water, other than water vapor. Unlike water vapor, plasma exhibits the properties of a fluid as well as a gas (Weltmann et al. (2018) *Plasma Processes and Polymers,* 16:1612-8850).

Figure 2:
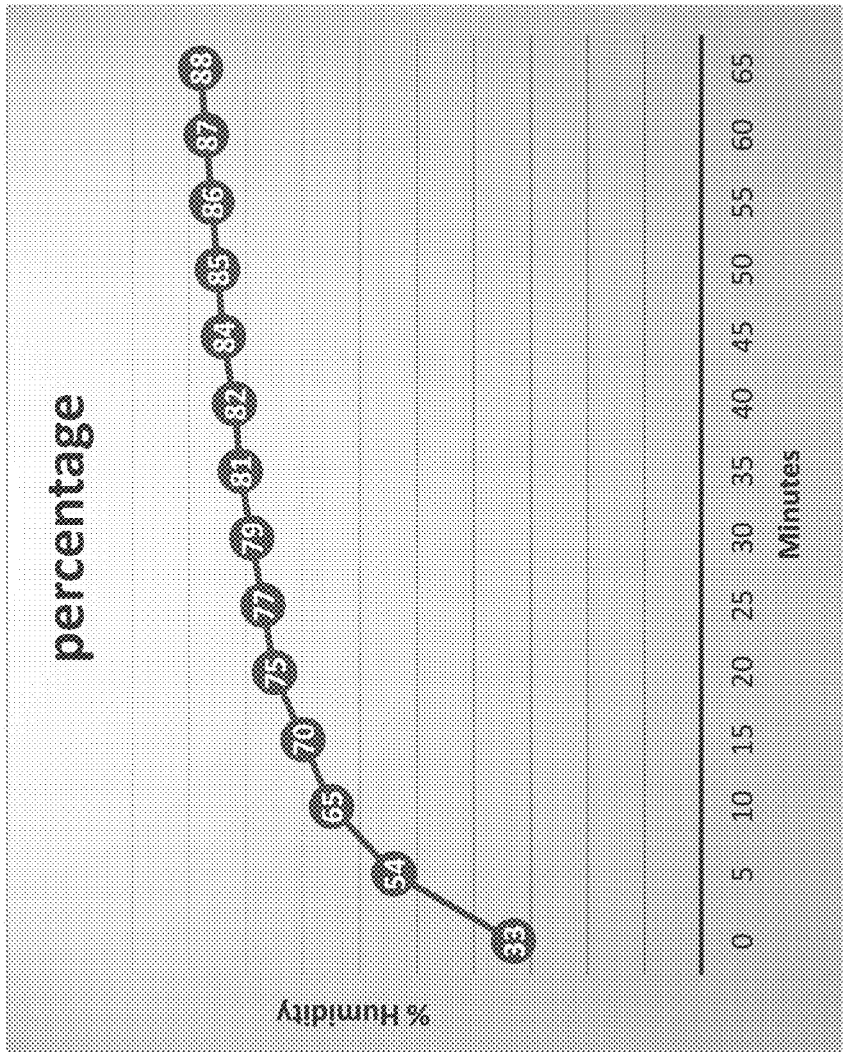
FIG. 2 is a graphical presentation of the relationship between time (X-axis) and % humidity (Y-axis). The average 5-minute percent changes of humidity progressively decreased as humidity levels approached the maximum level of 99%. After reaching 99% humidity, the jars were removed from the water. Each jar was placed on a shelf to be observed for 30 days.

In a second series of experiments (n=8), the same experimental setup was utilized, and the percent change in humidity was registered every five minutes for two hours. As shown in FIG. 2, the percent change of the first 5 minutes (21%) was significantly greater than the percent change in the last 5-minute interval (1%), $p<0.05$. This demonstrated that the rate of change in the humidity levels was not linear; the largest percent change in humidity was seen in the first 5 minutes and markedly slowed as it approached the maximum humidity levels. These data also showed that the free water molecule concentration gradient between the outside bulk water and the inside of the glass jar was highest at the beginning of the experiment. The concentration gradient reached equilibrium as the free water molecule concentration reached maximum values in the sealed glass jar.

In the first and second series of experiments, a bulk water source is separated from an air-filled container by a porous glass barrier. Free water molecules pass through the barrier by hydrostatic pressure and concentration gradient which allowed free water molecules to pass through the glass pores at a decreased rate over time, as indicated in FIG. 2. When the jars were removed from the water, the 99% humidity level reading in the jars remained constant for at least 30 days.

Figure 3:
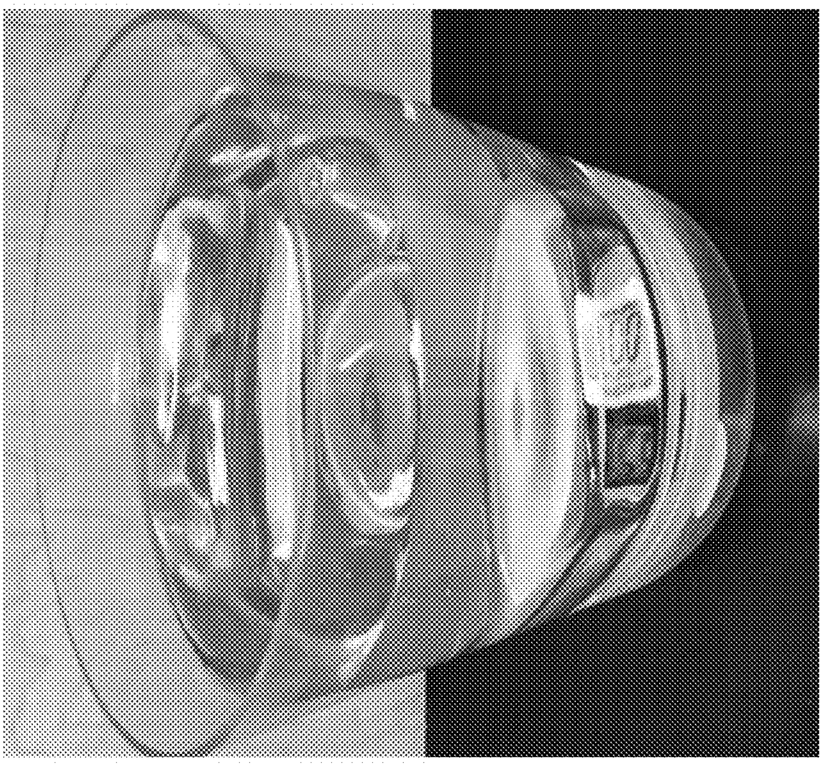
FIG. 3 contains a photograph of another non-limiting embodiment of a hybrid-plasma-generating chamber constructed in accordance with the present disclosure, in which a hygrometer and ion counter are sealed in a jar underwater.
Figure 4:
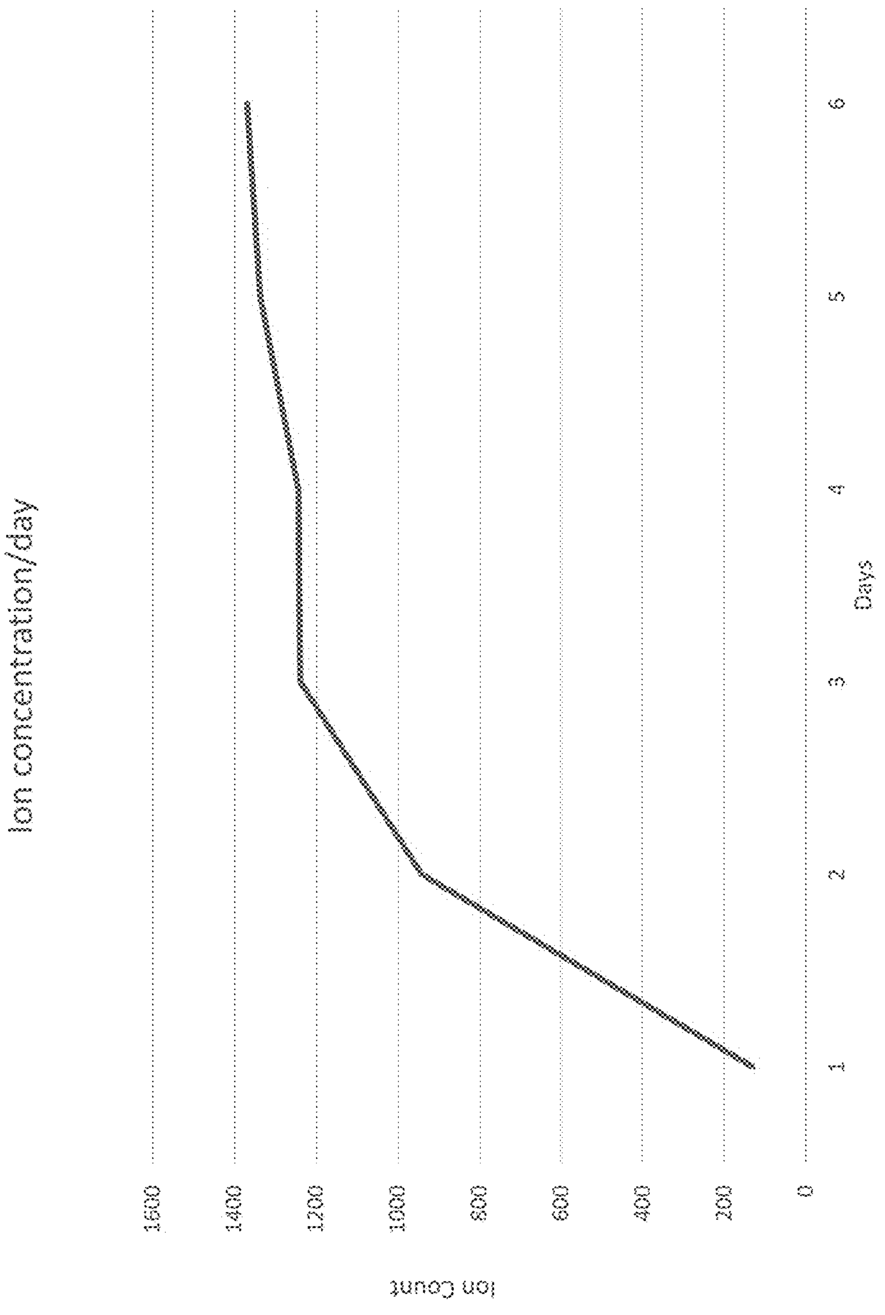
FIG. 4 is a graphical presentation of the relationship between ion counts and time in days.

To determine the mechanism for the lack of a reverse concentration gradient between inside the jar and the outside ambient environment, another series of experiments was performed. In this third series of experiments (n=6), both a hygrometer and an ion counter were sealed in the jars under water (FIG. 3) and then placed outside in room air for seven days. The jars fitted with both a hygrometer and an ion counter allowed for humidity and ion count to be followed daily when each jar was removed from the water, as described above, and placed on a shelf at room temperature. The humidity and ion levels were observed daily for seven days, as shown in FIG. 4. Not only did the humidity level remain constant for seven days, but there was also a progressive increase in the ion concentration during that time period.

While not wishing to be bound by a particular theory, it is believed that free water molecules in bulk water, because of their small size (2.7 Å) compared to the size of the glass pores (8-10 Å), can move through the glass (acting as a molecular filter) due to the concentration gradient from bulk water (outside) to air (inside). Once inside, unimpeded by bulk water, the inherent kinetic energy of the free water molecules causes collisions. The collisions produce free electrons stripped from the hydrogen and oxygen atoms of the water molecules, which initiated an ionization reaction. This reaction consisted of positive (H+) and negative (OH−) ions that form a "soup" of ionized gas that becomes a self-sustaining plasma. The simultaneous existence of maximum humidity levels and high ion concentrations supports this theory. As mentioned above, plasma is characterized as having properties of both a liquid and a gas, and plasma can act as a fluid which can be contained in the jar as would a liquid poured into the jar, and the experiments described herein above demonstrated that humidity levels progressively increased to the maximum value of 99% in all jars by the 4th hour. It should be noted that the humidity in this context is a surrogate for the presence and level of plasma.

This presumptive plasma would represent another form of non-thermal plasma induced without any external energy input. In contrast to non-thermal plasmas caused by high energy input, which are short lived (i.e., seconds) and difficult to separate their effects from the initiating energy source, this novel form of non-thermal plasma produced in the absence of external energy can be readily acquired/harvested, accumulated in large volumes, stored for extended periods of time, studied, and applied in various scientific, medical, and commercial applications.

Figure 5:
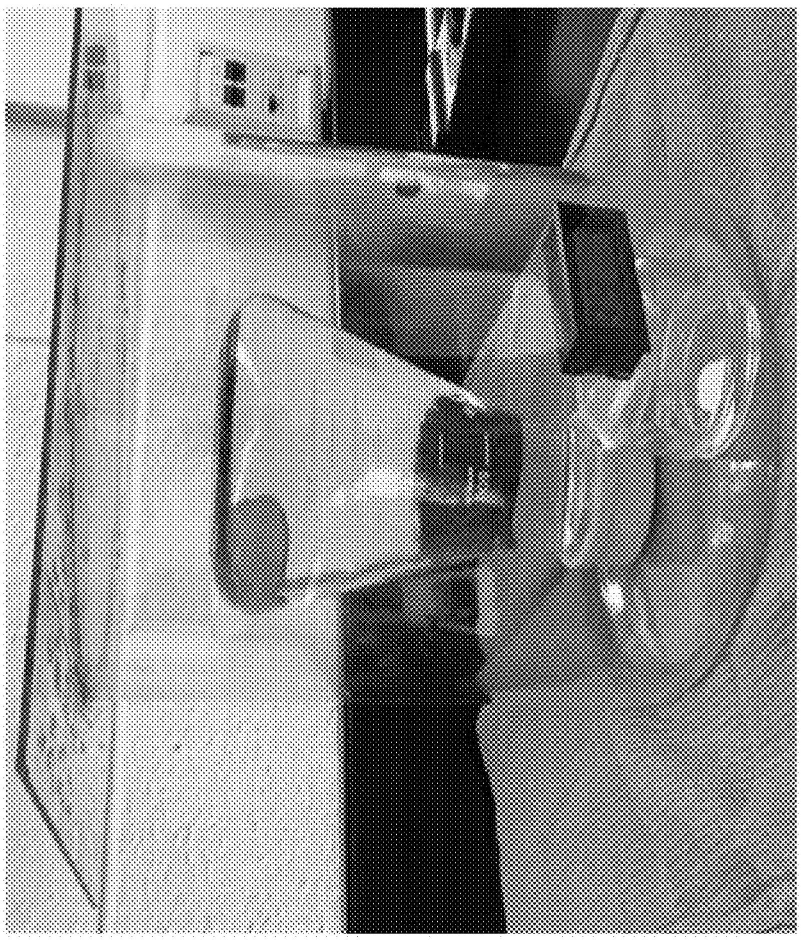
FIG. 5 contains a photograph of another non-limiting embodiment of a hybrid-plasma-generating chamber constructed in accordance with the present disclosure. A glass flask was filled with distilled water and sealed in a large plastic canister. A hygrometer sitting on ajar in the middle of the canister registered the humidity.

FIG. 5 depicts another experiment demonstrating the reversal of the concentration gradient in a hybrid-plasma-generating device constructed in accordance with the present disclosure. Distilled water was used to fill a large glass flask, and the water filled flask was placed in a large, thick walled, transparent plastic canister that was sealed at the top after a hygrometer (average ambient humidity 50%) was placed in the middle of the vessel for viewing. Within 24 hours, the hygrometer reading showed 99% humidity.

The inventors hypothesized that the free water molecules in the bulk water inside the flask passed through the glass pores based on size differences as well as the concentration gradient from inside the water filled vessel to the outside air in the large container. Once unimpeded by the bulk water, the inherent kinetic energy of the free water molecule collisions caused stripping of electrons from hydrogen and oxygen atoms to form plasma consisting of ions and free electrons.

Figure 6:
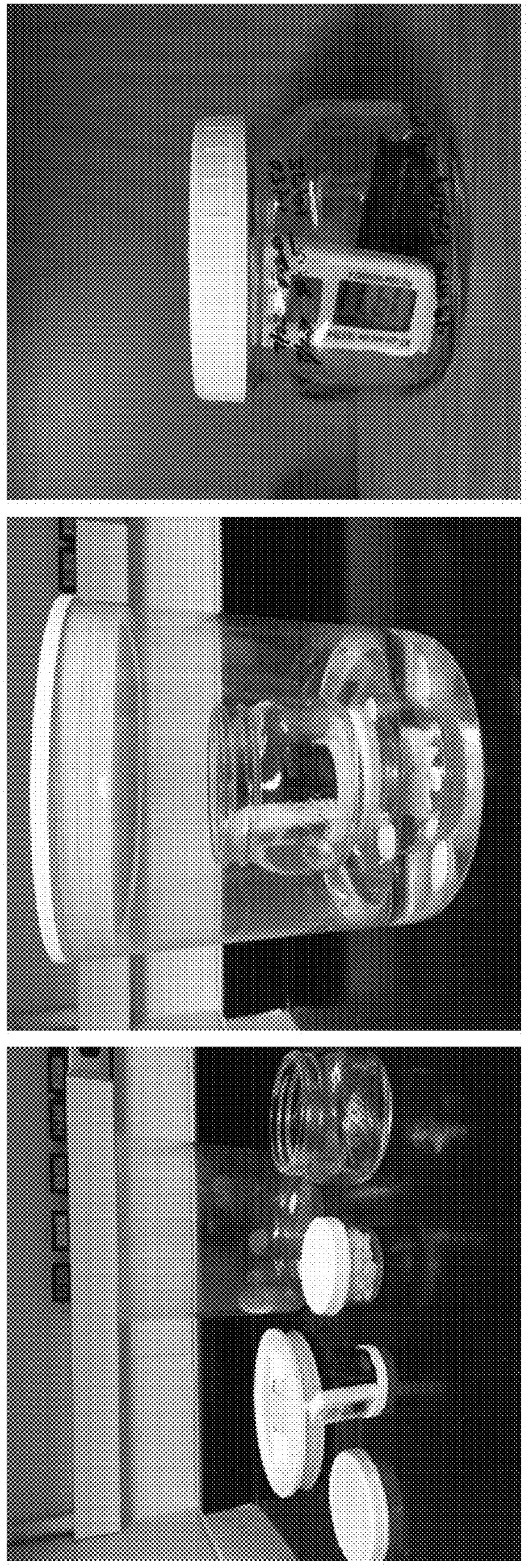
FIG. 6 contains photographs of another non-limiting embodiment of a hybrid-plasma-generating chamber constructed in accordance with the present disclosure.

FIG. 6 demonstrates another non-thermal hybrid-plasma generating device and method in accordance with the present disclosure. In this method, an open jar with a hygrometer and ion counter was placed in a container having a standing pool of water therein, and the container was then sealed. After 24-48 hours, the open jar was covered and removed. A reading of 99% humidity and high ionized plasma concentration registered on the ion counter.

Example 2

This Example demonstrates diffusion of free water molecules and plasma formation from a relatively large surface area of standing bulk water in a hybrid-plasma-generating device constructed in accordance with the present disclosure.

Figure 7:
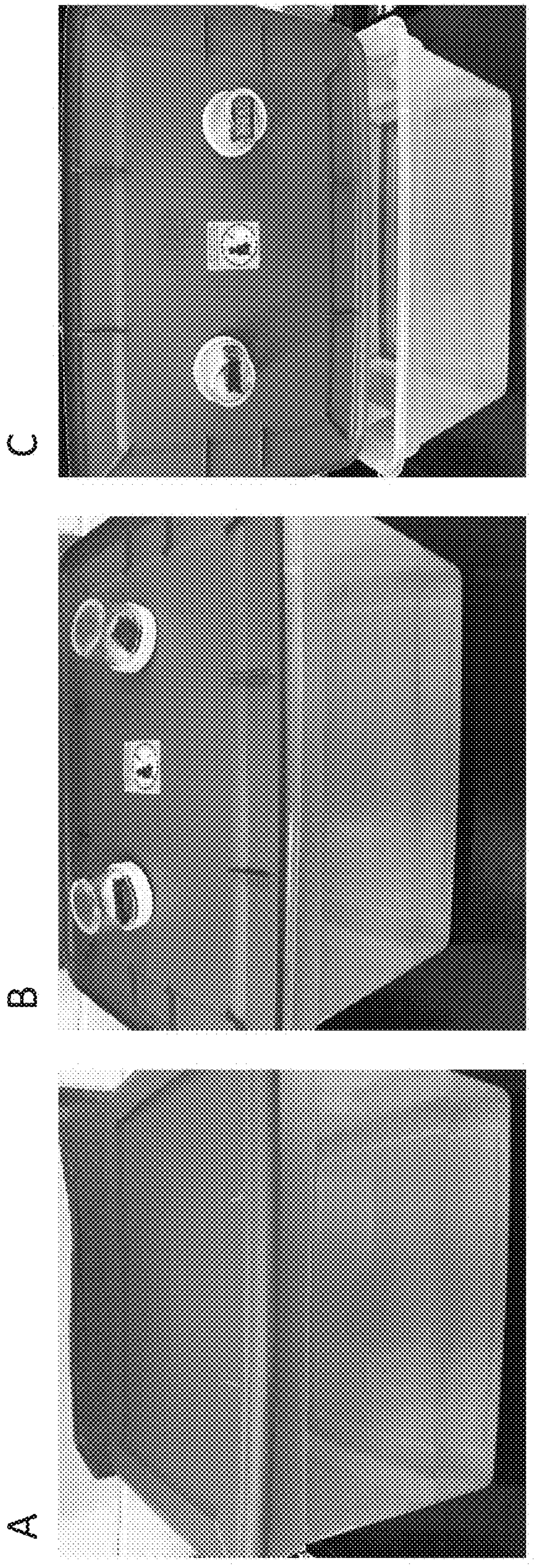
FIG. 7 contains photographs of another non-limiting embodiment of a hybrid-plasma-generating chamber constructed in accordance with the present disclosure. (A) Large plastic container. (B) and (C), two small jars connected to the container's lid with Velcro.

One-fourth of a heavy-duty plastic large container was filled with distilled water (FIG. 7, Panel A). Hygrometers were placed in each of two air filled jars, which were then sealed with plastic lids. Velcro was used adhere the two jars to the snap cover for this container (FIG. 7, Panel B). The cover and hanging glass jars were then placed over the water filled container and snap sealed (FIG. 7, Panel C). After 24 hours, the hygrometers in which the humidity was initially at ambient level (~50%) were both at 90% humidity.

The inventors hypothesized that the free water molecules that escaped from the surface of the bulk water in the large container filled the air over the water. Once unimpeded by the bulk water, the inherent kinetic energy of the free water molecules caused collisions to occur that stripped electrons from hydrogen and oxygen atoms to form plasma, a 'soup' consisting of ions and free electrons. With the help of a concentration gradient, free electrons and free water molecules, based on their size differences between those of the jar's glass pores acting as a molecular filter, allowed accumulation of plasma in the jars. Therefore, humidity is an indicator of the level of gaseous plasma. Another indicator of the presence of plasma was observed when the jars were removed from the container and placed on a shelf. The 99% humidity level remained unchanged for more than 30 days.

This Example thus demonstrates the generation of large amounts of non-thermal hybrid-plasma in accordance with the present disclosure.

Example 3

This Example demonstrates preservation of food without refrigeration and the anti-dehydration effects of hybrid-plasma generated in accordance with the present disclosure.

Figure 8:
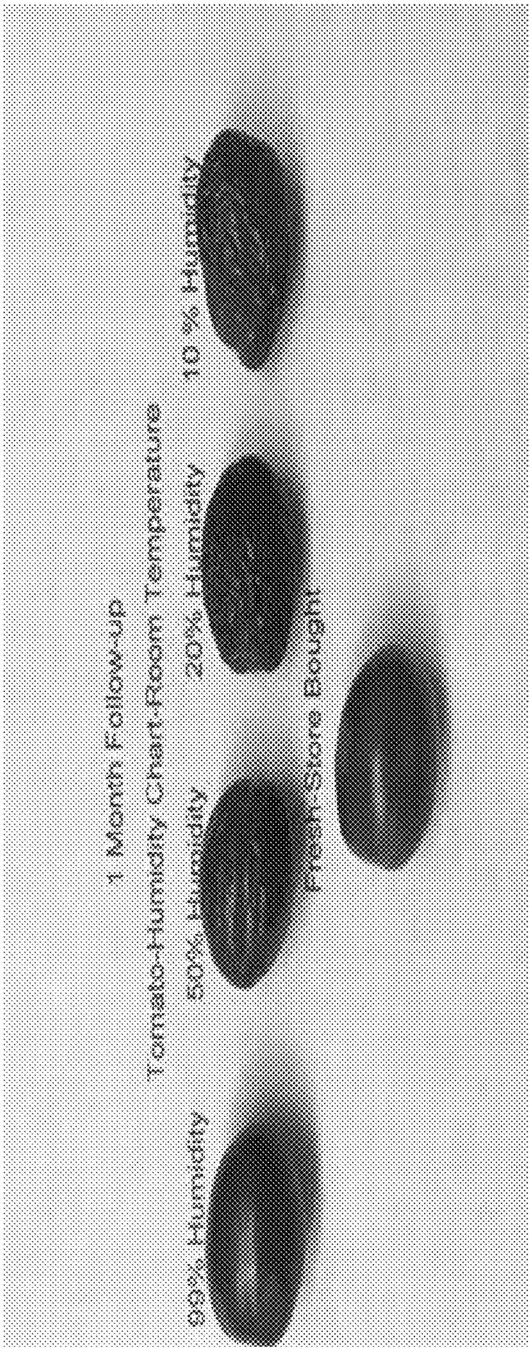
FIG. 8 contains a photograph of a comparison of tomatoes after 1 month in different environments, demonstrating preservation of produce using non-thermal hybrid-plasma constructed in accordance with the present disclosure for prolonged periods at room temperature and without refrigeration.

FIG. 8 compares (i) a tomato exposed for one month in a chamber constructed in accordance with the present disclosure at a humidity level of 99% at room temperature, (ii) tomatoes kept at room temperature at various humidity levels (50%, 20%, 10%) for the same period of time, and (iii) a fresh, store bought tomato. Note the crinkling of the tomatoes' skins in (ii), indicative of severe water loss. The high humidity maintained for one month is an indication of the persistent presence of hybrid-plasma, which is responsible for the anti-dehydration properties shown in this Example.

Figure 9:
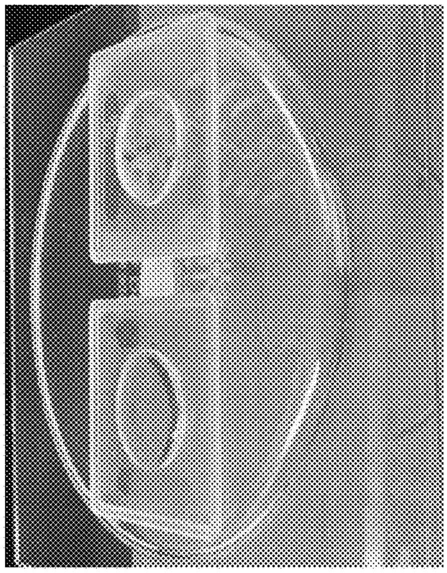
FIG. 9 contains a photograph comparing anti-dehydration in hybrid-plasma and non-plasma environments using uncovered deep well slides. Left, no evaporation after 10 days in hybrid-plasma. Right, dehydration after 24 hours in air.

Another example of anti-dehydration is shown in FIG. 9. An uncovered deep well slide filled with liquid was placed in a hybrid-plasma environment, and a duplicate test slide was placed in a non-plasma environment as a control. After two days, the control liquid had evaporated. However, the original liquid was still present in the slide placed in the hybrid-plasma environment after 10 days.

Example 4

This Example demonstrates the anti-oxidant effects of hybrid-plasma generated in accordance with the present disclosure.

Figure 10:
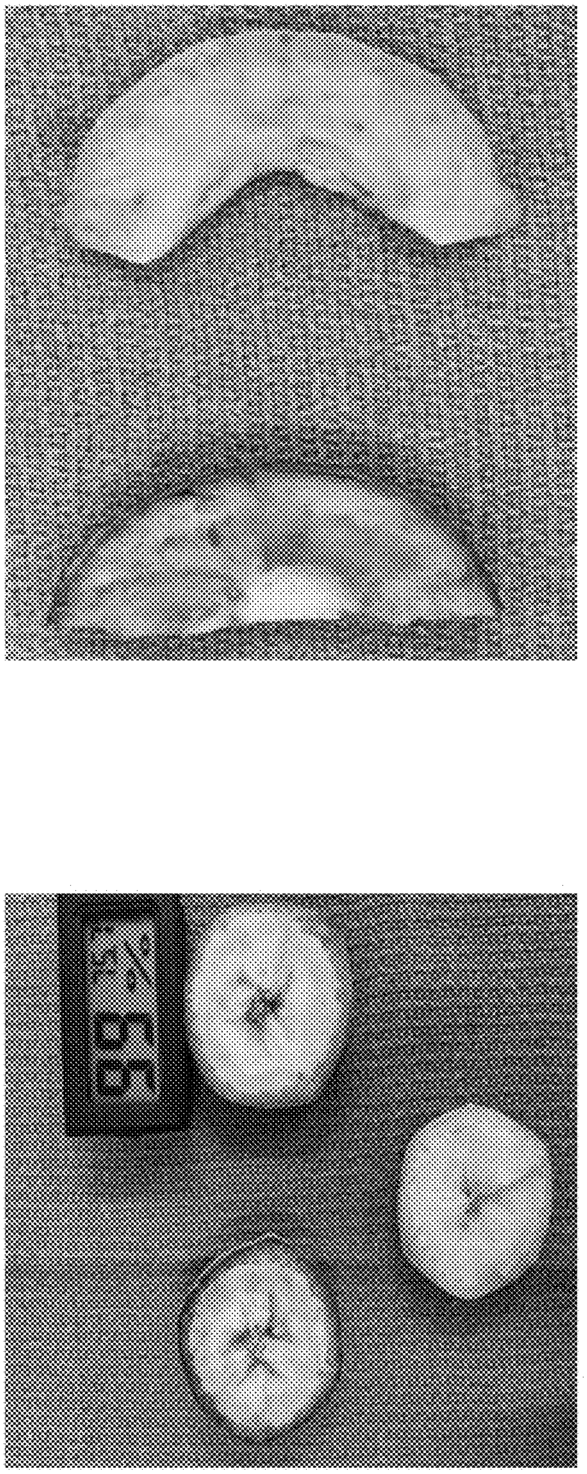
FIG. 10 contains photographs of anti-oxidant effects of non-thermal hybrid-plasma generated in accordance with the present disclosure. (A) Left—banana slice at room temperature; right—banana slice in hybrid-plasma; lower—fresh banana slice. (B) Left—avocado 24 hrs at room temperature; right—avocado 24 hrs in hybrid-plasma at room temperature.

In Panel A of FIG. 10, a fresh banana was cut into pieces, and one banana piece was subjected to a hybrid-plasma environment, while another banana piece was subjected to the ambient environment, both at room temperature. After 24 hours, an anti-oxidizing effect was observed in the banana piece subjected to the hybrid-plasma environment (right) when compared to the banana piece subjected to ambient conditions (left).

In Panel B of FIG. 10, a fresh avocado was cut into pieces, and one avocado piece was subjected to a hybrid-plasma environment, while another avocado piece was subjected to the ambient environment, both at room temperature. After 24 hours, an anti-oxidizing effect was observed in the avocado piece subjected to the hybrid-plasma environment (right) when compared to the avocado piece subjected to ambient conditions (left).

Example 5

This Example demonstrates the anti-aging effects of hybrid-plasma generated in accordance with the present disclosure.

In the previous examples, a method for the formation of a novel, non-thermal hybrid-plasma without the application of external energy is described in which a sealed jar of air is placed under a large volume of distilled water. In this manner, free water molecules could be separated from bulk water along an osmotic concentration gradient through the pores in the glass jar; once separated from bulk water, the inherent kinetic energy of the free water molecules causes stripping of electrons from the neutral water atoms, and the resulting mixture of positive and negative ions constitutes a low level ionization reaction, i.e., a new form of non-thermal plasma.

In the present Example, this difference was used to study one of the potential applications of this non-thermal hybrid-plasma. One such application was the growing of plants under conditions which do not require soil nor added water for maintenance of the life of the plant over relatively long time periods.

Methods

The Hybrid-plasma Generator: The bottom of an 18-quart plastic storage container was filled with 4000 mL of distilled water. A rectangular plastic insert lined with perforations served as a platform standing above the water experiments. As free molecules diffused into the air space from the water inside the sealed container, their kinetic interaction resulted in the generation of the new form of non-thermal plasma or hybrid-plasma of the present disclosure. The self-sustained reaction was registered by a hygrometer and a mini-ion counter placed on the platform well above the water level. Generation of this novel non-thermal plasma continued as long as the water line. Within 24-48 hours, the humidity registered 99%, and the ion count was well over $1000\times10^3$ ion counts/$cm^3$. Uncovered 500 mL glass jars fitted with an ion counter and hygrometer were placed on the platform above the water in the sealed container. After 24 hours, all ion counters in the open jars inside the chamber registered in the same values as measured for the ambient environment.

Figure 11:
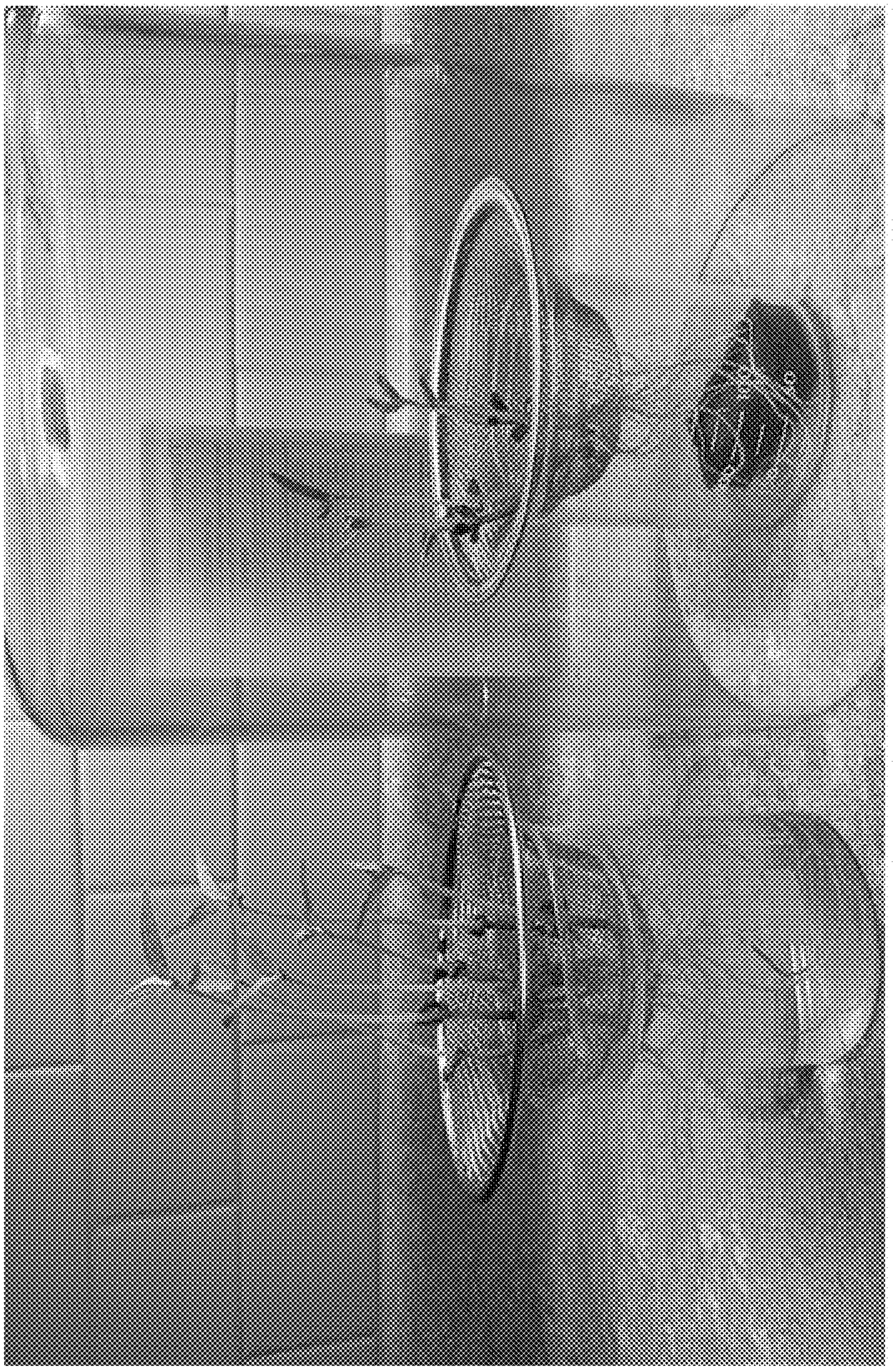
FIG. 11 contains photographs of mung bean plant growth in hybrid-plasma environment (right) or water (left).

First series of experiments: For sprouting of Mung bean plants, 200 ml beakers were filled with distilled water (n=12). A stainless-steel strainer was placed on each so that a small amount of water was showing at the top. Ten Mung bean seeds were put into the water well, and each beaker was put in a drawer which was closed so as to keep the beans in the dark for 48 hours. Afterward, the beakers were removed to room light. The hulls that shed from the seeds were discarded, thus allowing the sprouted seedlings to start growing as small plants. The same age seedlings were paired so that one remained growing hydroponically. The other seedling was removed from the water, the roots and base of the strainer lightly blotted to remove excess water, and then placed under an inverted plastic container (FIG. 11). As a control, another seedling was removed from the water, and the strainer placed on an air-filled beaker, i.e., no water. The condition of the plants was monitored daily. At the end of a week, plants were removed from their strainers, and comparable measurements were made of stem length and leaf area (length×width). The data are shown in Table 2.

Second series of experiments: Another set of age paired plants treated as above were allowed to grow for one week. At the end of a week, the plant growing in the plastic container was removed and placed in a beaker with water matching the hydroponic state of its paired partner. The two plants were observed daily for the next 7 days.

Statistical Analysis: The measurements of stem length and leaf area were compared between plants grown hydroponically and those grown in a sealed waterless environment using a non-paired T-test. A p-value of 0.05 was considered significant.

Results

FIG. 11 illustrates that the plant growing hydroponically (left) developed as would be expected. The plant previously placed in ajar exposed to the hybrid-plasma for 24 hours and then transferred and confined in the sealed cylinder (right) also had grown, but the leaves were markedly under developed compared to its age-paired partner (Table 2). In contrast, the plant placed in the ambient environment had completely wilted within the 24-hour period (not shown).

TABLE 2

Comparison of Stem Length (cm) and Leaf Area of Plants Grown in Water (Control) Versus Hybrid-Plasma

| | Control (Hydroponic) | | Hybrid-Plasma Treated | |
|---|---|---|---|---|
| Exper # | Stem Length | Leaf Area | Stem Length | Leaf Area |
| 1 | 18 | 4.5 | 13.4 | 0.8 |
| 2 | 17.9 | 3.4 | 13.2 | 0.8 |
| 3 | 13.9 | 5.3 | 15.1 | 0.8 |
| 4 | 12.5 | 5.2 | 8.5 | 0.2 |
| 5 | 20.5 | 5.4 | 13.3 | 1 |
| 6 | 14 | 5.7 | 17 | 0.5 |
| 7 | 14.8 | 2.5 | 10 | 0.5 |
| 8 | 16.6 | 1.6 | 13.5 | 0.9 |
| 9 | 19.5 | 3 | 15.3 | 1 |
| 10 | 16.8 | 3.8 | 18 | 0.8 |
| Average | 17 | 4 | 14 | 1 |
| SD | 3 | 1 | 3 | 0.2 |
| p-value | | | 0.04 | 0.003 |

Figure 12:
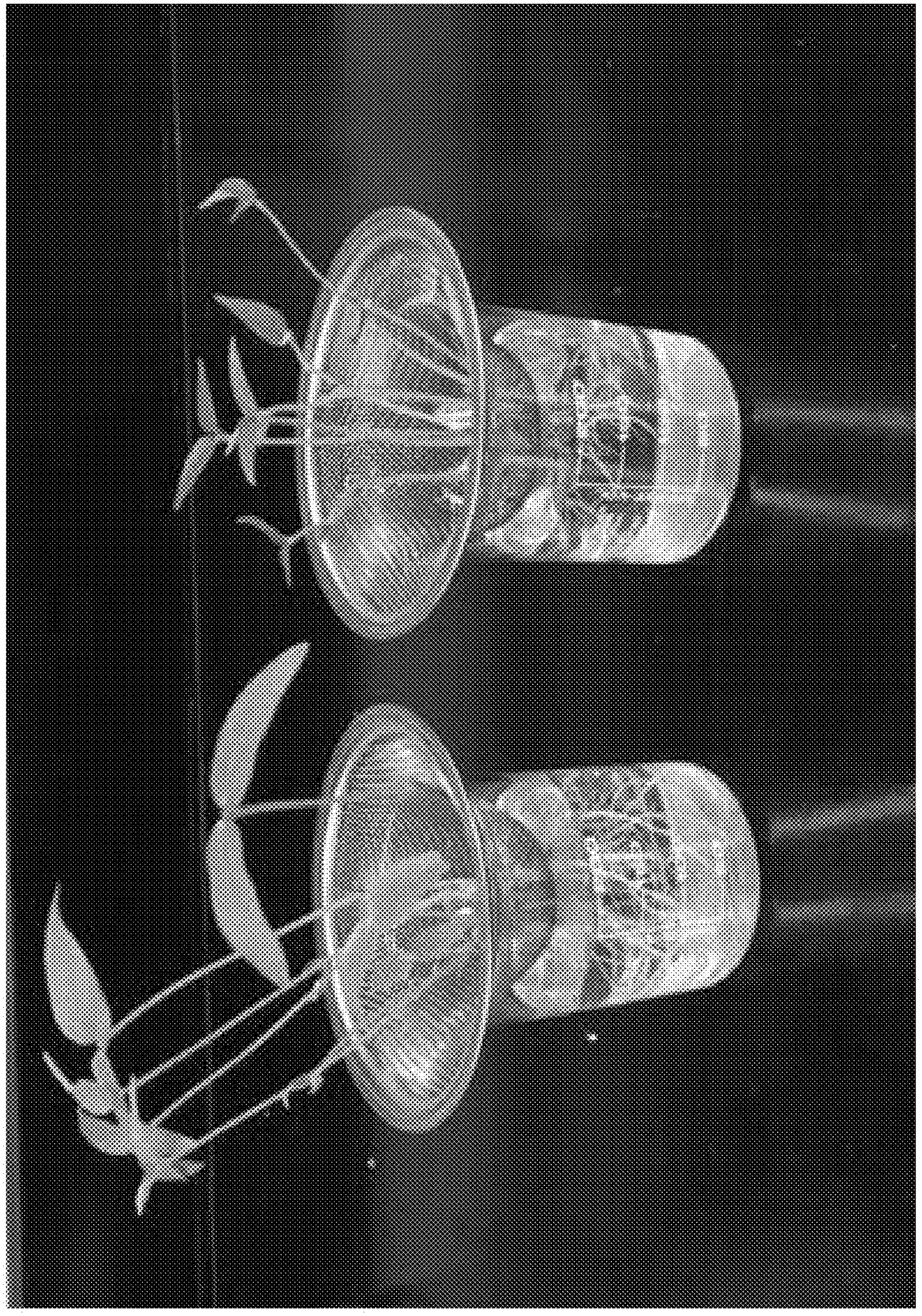
FIG. 12 contains photographs showing side by side comparison of plant grown hydroponically to plant grown in hybrid-plasma and then transferred to water.

After 1 week, the plant grown in hybrid-plasma was placed in a hydroponic environment (i.e., the plant was transferred to a 200 mL beaker and its roots immersed in the same amount of water as the plant grown hydroponically throughout the experimental period), and the age-paired plants were maintained in water for one week. FIG. 12 shows the side by side comparison of the two age-paired plants. Note that the plant previously grown in hybrid-plasma (right) showed diminished growth and leaf size than its age-paired partner grown only in water (left).

In another control, a plant was placed in the ambient environment without water; this plant completely wilted after the first 24 hours (not shown).

Discussion

Paired Mung bean seedlings of the same age were grown hydroponically before being separated so that one was removed from water and placed in a beaker containing hybrid-plasma. The beaker was placed under an inverted acrylic container which was instrumented with a hygrometer and mini-ion counter. Evidence that water was present was indicated by humidity level at or near 99%, well above ambient humidity. Evidence of the presence of a gas was indicated by the ionization levels throughout the enclosed container, which corresponds to the properties of a gas which disperses throughout a closed space. After 7 days, both seedlings showed growth, but the one grown in the hybrid-plasma was significantly undersized in stem length and leaf area, $p<0.05$. Humidity levels were consistently over 90% and ion counts were consistently over $1000\times^3$ ions/$cm^3$.

Another set of paired seedlings grown separately were then allowed to continue growing with the one grown in hybrid-plasma returned to the hydroponic environment. After seven days of continued growth, the seedling grown in hybrid-plasma continued growth of stem length and leaf area, but was still undersized compared to its same aged partner.

The term "hybrid-plasma" is used herein to refer to a non-thermal plasma generated in accordance with the methods of the present disclosure. Hybrid-plasma comprises a mixture of water and gas and has the properties of water, as evidenced by the measured 90% humidity levels and ionized gas since it expanded into the large container with ion counts well above $1000\times^3$ ions/$cm^3$.

The present Example provides observations which indicate that hybrid-plasma can sustain growth of the Mung bean seedling for prolonged periods, in this case 7 days, without water; however, normal growth (as shown by its same age partner grown hydroponically) is much faster. Therefore, hybrid-plasma possesses anti-aging properties. The idea that there is a negative relationship between the resting metabolic rate (RMR) and lifespan is at least 100 years old and probably originated with Rubner (Das Problem der Lebensdauer und seiner beziehungen zum Wachstum und Ernahrung. (1908) Munich: Oldenberg), who observed that larger, longer lived animals had lower metabolic rates; in particular, he observed that the product of their metabolism (per gram) and lifespan was essentially constant. Others have proposed that organisms that grow fast due to a higher metabolic rate have a shorter lifespan than those who have low metabolic rate, citing the shorter life span of mice compared to whales (Pearl (The Rate of Living (1928) University of London Press UK). This theory has not been without its detractors (Speakman et al. (2002) Journal of Nutrition, 132:1583S-1597S). In the present Example, the difference in the growth rate of the seedling in the hybrid-plasma and those grown hydroponically can be seen in the underdeveloped leaves, even when those seedlings were removed from the hybrid-plasma and placed in the water environment.

While not wishing to be bound by theory, it is hypothesized that, as the leaf is the source of the plant's metabolism, the smaller leaf size reduces the metabolic engine, providing the basis of the delayed growth and potentially longer lifespan. Further, the hybrid-plasma may be acting as a catalyst by enhancing levels of auxin, a plant growth hormone, to increase growth of roots and stems (which contain auxin) but inhibit growth of leaves and thereby slowing photosynthesis and aging of the plant in general.

Example 6

Production of Fungal Pellets

Figure 13:
FIG. 13 contains a photograph showing the production of fungal pellets upon exposure to a non-thermal hybrid-plasma environment in accordance with the present disclosure.

Room temperature non-thermal hybrid-plasma enhanced growth of fungus on Mung bean seeds, as shown in FIG. 13. Store bought Mung bean seeds shown on right developed into fungal pellets after several days being in the non-thermal hybrid-plasma environment.

These results provide a potential for new antibiotic development

Example 7

Use of Non-Thermal Hybrid-Plasma as a Non-Invasive Therapy to Treat Various Conditions, Including SARS-CoV-2 Infection As the COVID-19 pandemic rages across the globe, a number of pharmaceutical agents (including Hydroxychloroquine, Remdesivir, Dexamethasone, and others) have been the subject of studies, with varying degrees of clinical efficacy. Hidden from the medical literature is the evidence gathered by investigators for more than a decade that negative air ions can inactivate coronaviruses.

Mitchell and King (Avian Dis. (1994) 38:725-732) performed experiments to determine the effect of negative air ions on airborne transmission of Newcastle disease virus in chickens. The use of negative air ion generators significantly reduced transmission from donor chickens with viral infection to susceptible chickens that were not inoculated with the virus.

Susuki and Kobayashi (Plasmacluster ions inactivate an airborne coronavirus: A world first verification research conducted jointly with the Kitasato Institute. Sharp Company. Press release 2004) used a specially designed ion generator that produced both positive as well as negative ions as a result of a plasma discharge (plasmacluster ions) determined by spectroscopy. These ions surrounded airborne micro-particles like fungal spores or viruses, creating highly reactive OH− negative ions that inactivated the various infectious particles. Electron microscopic observations indicated that plasmacluster ion treatment was associated with decomposed virus fragments.

Recently, Scherlag et al. (Lett Health and Biol Sci. (2020) 5:1-3) developed an apparatus that induced a negative ion atmosphere and elaborated on the mechanism of action by which hydroxyl, OH− attaches to the positively charged protein at the end of the viral spikes. It is well known that the viral spikes represent the modis operandi for virus attachment in body cells allowing injection of the virus's DNA. Subsequent control of the cell's genetic machinery results in producing more viruses to overwhelm organ function.

It is interesting to note that a recent publication by Liu et al. (Nature (2020) 584:450-456) collected antibodies from infected individuals. Epitope mapping showed that this collection of 19 antibodies were equally divided between those directed to the receptor binding domain (RBD) and those to the N-terminal domain (NTD), indicating that both of these regions at the top of the viral spike are immunogenic. In addition, neutralizing monoclonal antibodies were tested in a hamster model of SARS-Cov-2 infection. Initially, the animals were injected with the injection of the antibody. Twenty-four hours later, the virus was introduced through an intranasal inoculation. Four days later, lung tissue was harvested to quantify the viral load. Results showed significant potency of the monoclonal antibody protection. Thus, these studies support the targeting of the N-terminal domains by both the monoclonal antibodies and the negative air ions for inactivating the infectious ability of coronaviruses.

In the same way, in vitro findings of the actions of negative air ions have been supported by animal studies. Duan et al. (Arzneimittelforschung (1994) 44:880-883)

studied the kinetics of inhaled water generated negative air ions or steam produced by a conventional nebulizer, both of which were labeled with $^{3}$H-thymidine in mice. The radioisotope was found in the alveoli of mice that inhaled water air ions but not in the mice that inhaled steam, which is indicative of the ability of negative air ions to reach the lungs and potentially enter the blood as gases are exchanged.

Another more practical aspect for the recognition of the potential role of negative air ions relates to the importance and at times problematic use of masks to prevent person to person spread by virus in air droplets. Masks are effective when worn but become of no use when they are removed for eating and drinking, for example. The internet is replete with negative air ion generators in the form of necklaces which can emit as few as 2 million or as many as 20 million ions per second. Such personal devices can serve as a second line of defense for the general public but more importantly for health care personnel.

Finally, the protection provided by negative air ions can be extended to large groups of people by attaching the appropriate generators to existing Heating/Ventilation/Air Conditioning (HVAC) systems. In fact, two universities (John Hopkins and the University of Oklahoma) have already installed these industrial sized units for dorm rooms and residence halls.

Based on the established ability of negative air ions to inactivate the infectious ability of coronaviruses, the non-thermal hybrid-plasma generating devices constructed in accordance with the present disclosure are utilized to produce the novel, non-thermal hybrid-plasma as described herein. This non-thermal hybrid-plasma is then utilized as an anti-microbial agent for treatment of surfaces and decontamination of environmental spaces.

In addition, the non-thermal hybrid-plasma is incorporated into a pharmaceutical composition for administration to a patient in the treatment of a microbial infection (such as, but not limited to, a COVID-19 infection). For example, and while not wishing to be bound by a particular theory, it is believed that hydroxide ions (OH−) present in the hybrid-plasma connect with the positively charged proteins at the ends of the spikes of the coronavirus, which prevents the naked spike proteins from attached to the negatively charged body cells for infection thereof.

Further, these pharmaceutical compositions containing non-thermal hybrid-plasma can be administered for treatment of various other conditions, including (but not limited to) wound treatment, cancer treatment, etc.

Example 8

Additional Applications for Use in the Food, Cosmetic, and Pharmaceutical Industries As established in the previous Examples, the non-thermal hybrid-plasma produced in accordance with the present disclosure has various activities that can be utilized to impact the safety, preservation, and storage of various items.

Most grocery chains utilize energy-based systems to create a humid environment for their fruits and vegetables. These methods range from atomizers spraying water on the produce to refrigerated containers.

One non-limiting embodiment of a device implementing the methods of the present disclosure is a "water wall" built behind the produce section or in enclosed units of a store (such as, but not limited to, a grocery store) to passively maintain a constantly high humidity level associated with a plasma environment. These devices provide a passive exchange of water molecules from a large surrounding water source into a smaller air space to create humidity levels of about 99%, and this results in a hybrid-plasma with added properties that enhances preservation. Any nascent water that develops can be drained back to the initial water source.

A similar unit to that described above for use in a grocery store can be reduced in size to be available for home use as a countertop appliance to preserve fruits and vegetables, cosmetics, comestibles, etc. for indefinite periods of time without refrigeration.

Similar devices of varying sizes could also be utilized by cosmetic companies and pharmaceutical companies to increase the efficacy and/or longevity of their products.

Example 9

Figure 14:
FIG. 14 contains a photograph of another non-limiting embodiment of a method for producing a non-thermal hybrid-plasma in accordance with the present disclosure.

This Example demonstrates an alternate embodiment of a method for producing a non-thermal hybrid-plasma in accordance with the present disclosure. A water-tight-covered 500 mL jar (FIG. 14) was equipped with an ion counter and a hygrometer, which were held by Velcro® to the bottom of a 4500 mL acrylic cylinder (n=6). The cylinder was filled with 4000 mL distilled water. After 24 hours, 90-99% humidity was registered on the hygrometers, and maximum readings of >2,000,000 ion counts/cm$^3$ registered on the ion counters. The ionization readings indicated a reaction had taken place. The sealed jars were placed on a shelf for daily measurements. The ion counts and humidity values declined over 14 days.

Example 10

Figure 15:
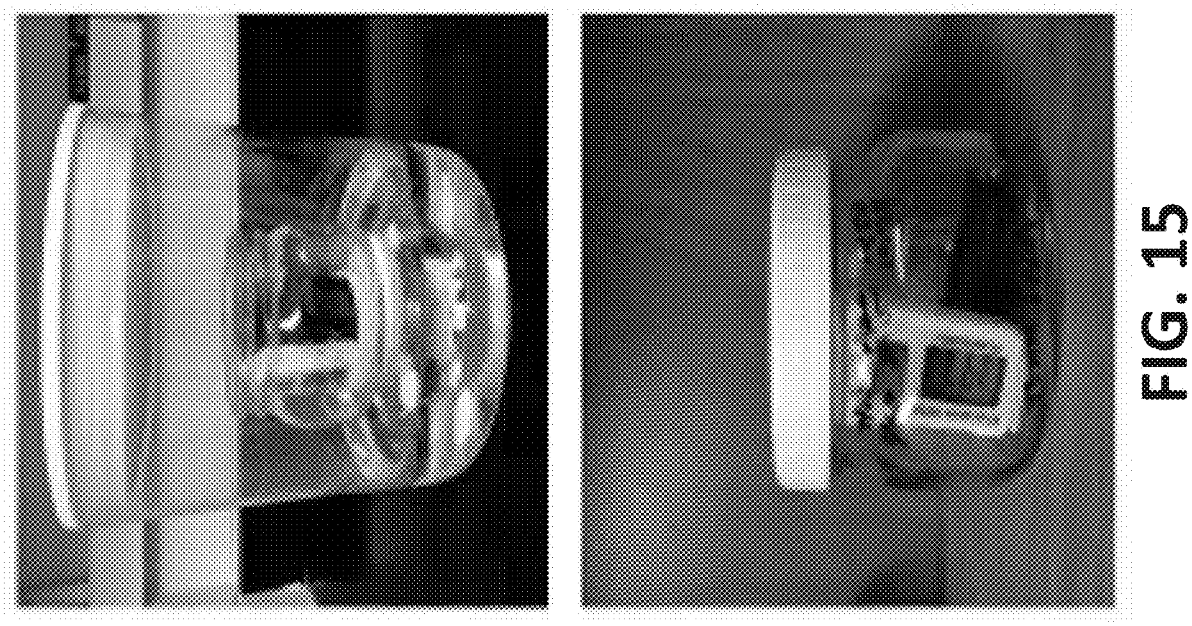
FIG. 15 contains photographs of another non-limiting embodiment of a method for producing a non-thermal hybrid-plasma in accordance with the present disclosure.

This Example demonstrates another alternate embodiment of a method for producing a non-thermal hybrid-plasma in accordance with the present disclosure. 800 mL of distilled water was added to a 4000 mL acrylic cylinder. Inside the cylinder, an uncovered 500 mL jar equipped with an ion counter and a hygrometer was placed on a platform above the water line (FIG. 15). The acrylic cylinder was covered. After 24 hours, high or maximum readings were registered on the ion counter and hygrometer. The uncovered jars were sealed with a plastic cover and placed on a shelf for daily observation (n=10).

Example 11

This Example demonstrates yet another alternate embodiment of a method for producing a non-thermal hybrid-plasma in accordance with the present disclosure. Twelve healthy, watered broadleaf plants were placed in a 19-quart plastic container and sealed with snap closers. After 24 hours, it was noted that the container showed maximum negative ion levels within seconds of introducing a sensitive ion counter to measure ionization levels and a hygrometer which indicated 90+ absolute humidity. These levels of ionization and humidity, the signature of Hybrid-plasma, remained stable for the next 30 days as monitored daily.

Non-Limiting Illustrative Embodiments

In conclusion, in at least one non-limiting embodiment, the present disclosure is directed to a generator that produces a non-thermal hybrid-plasma, wherein the generator comprises (1) a sealed glass container having a first end, a second end, a sidewall, and a receiving space, and wherein ambient air is sealed within the receiving space of the sealed glass container; (2) a second container in which the sealed glass container is placed, wherein the second container has a first end, a second end, and a receiving space having a volume that is sufficiently larger than the sealed glass container; and (3) water disposed in the second container in a sufficient volume to surround at least a portion of the sidewall of the sealed glass container; wherein the second container is sealed and/or the sealed glass container is submerged in the water disposed in the second container; and wherein the non-thermal hybrid-plasma is generated within the sealed glass container. The second container may be sealed, wherein the water disposed in the second container surrounds a portion of the sidewall of the sealed glass container. The second container may be sealed, wherein the water does not substantially contact the sealed glass container. The first or second end of the glass container may be formed by sealing the glass container with a lid formed of at least one of glass and plastic. The first end of the glass container may be open, wherein the glass container is sealed by placement or attachment of the first end of the sealed glass container upon a closed first end of the second container. The second container may be formed of at least one of glass and plastic.

In at least one non-limiting embodiment, the present disclosure is directed to a chamber that produces a non-thermal hybrid-plasma, wherein the chamber comprises (1) a sealed glass container having a first end, a second end, a sidewall, and a receiving space; (2) water sealed within at least a portion of the receiving space of the sealed glass container; (3) a second sealed container in which the sealed glass container is placed, wherein the second container has a first end, a second end, and a receiving space having a volume that is sufficiently larger than the sealed glass container; and wherein a non-thermal hybrid-plasma is generated within the second sealed container. The second container may be formed of at least one of glass and plastic. In at least one non-limiting embodiment, the present disclosure is directed to a method in which at least one item is disposed in the chamber.

In at least one non-limiting embodiment, the present disclosure is directed to a method of generating a non-thermal hybrid-plasma, the method comprising the steps of (a) sealing ambient air within a glass container having a first end, a second end, a sidewall, and a receiving space, wherein ambient air is sealed within the receiving space of the glass container; (b) placing the sealed glass container within a receiving space of a second container, wherein the receiving space of the second container has a volume that is sufficiently larger than the sealed glass container; (c) performing a step selected from: (i) filling at least a portion of the receiving space of the second container with water and sealing the second container; and (ii) filling at least a portion of the receiving space of the second container with a sufficient volume of water so as to submerge the sealed glass container; and (d) incubating the sealed glass container within the water-filled second container for a period of time sufficient to generate the non-thermal hybrid-plasma within the sealed glass container. In step (c)(i) of the method, the water disposed in the second container may surround a portion of the sidewall of the sealed glass container. In step (c)(i) of the method, the water may not substantially contact the sealed glass container. In step (a), the first or second end of the glass container is formed by sealing the glass container with a lid formed of at least one of glass and plastic. In the method, the first end of the glass container may be open, and steps (a) and (b) may be performed simultaneously such that the glass container is sealed by placement or attachment of the first end of the sealed glass container upon a closed first end of the second container. In the method, the second container may be formed of at least one of glass and plastic. The method may additionally comprise a step (e) of removing the sealed glass container from the second container. The method may additionally comprise a step (f) of storing the sealed glass container for a period of time. The method may additionally comprise a step (g) of recovering the non-thermal hybrid-plasma.

In at least one non-limiting embodiment, the present disclosure is directed to a method of generating a non-thermal hybrid-plasma, comprising the steps of (a) filling at least a portion of a receiving space of a glass container with water; (b) sealing the water within the glass container to form a sealed glass container; (c) placing the sealed glass container within a receiving space of a second container, wherein the receiving space has a volume that is sufficiently larger than the sealed glass container; (d) sealing the second container having the sealed glass container therewithin; and (e) incubating the water-filled, sealed glass container within the sealed second container for a period of time sufficient to generate the non-thermal hybrid-plasma within the second sealed container. The second container may be formed of at least one of glass and plastic. The method may further comprise the step (g) of recovering the non-thermal hybrid-plasma.

In at least one non-limiting embodiment, the present disclosure is directed to the non-thermal hybrid-plasma generated by any of the above methods. In at least one non-limiting embodiment, the present disclosure is directed to a method of growing a plant by exposing the plant to the non-thermal hybrid-plasma generated by any of the above methods. The plant may be exposed to the non-thermal hybrid-plasma in the absence of soil and/or water. In at least one non-limiting embodiment, the present disclosure is directed to a method of treating a comestible by exposing the comestible to the non-thermal hybrid-plasma generated by any of the above methods. The comestible may be exposed to the non-thermal hybrid-plasma in the absence of refrigeration. In at least one non-limiting embodiment, the present disclosure is directed to a method of treating a surface by contacting the surface with the non-thermal hybrid-plasma generated by any of the above methods. The method of treating the surface may be a method of disinfecting the surface. In at least one non-limiting embodiment, the present disclosure is directed to a method of treating a condition in a subject by administering the non-thermal hybrid-plasma generated by any of the above methods. The condition treated may be selected from a bacterial infection, a viral infection, such as SARS-CoV2, a wound, and a cancer.

While the attached disclosures describe the inventive concept(s) in conjunction with the specific drawings, experimentation, results, and language set forth hereinafter, it is evident that many alternatives, modifications, and variations will be apparent to those skilled in the art. Accordingly, it is intended to embrace all such alternatives, modifications, and variations that fall within the spirit and broad scope of the present disclosure.

What is claimed is:

1. A generator that produces a non-thermal hybrid-plasma, the generator comprising:

a sealed glass container having a first end, a second end, a sidewall, and a receiving space, and wherein ambient air is sealed within the receiving space of the sealed glass container;

a second container in which the sealed glass container is placed, wherein the second container has a first end, a second end, and a receiving space having a volume that is sufficiently larger than the sealed glass container; and water disposed in the second container in a sufficient volume to surround at least a portion of the sidewall of the sealed glass container;

wherein at least one of:

(i) the second container is sealed; or (ii) the sealed glass container is submerged in the water disposed in the second container; and wherein the non-thermal hybrid-plasma is generated within the sealed glass container; and wherein the generator does not contain an external energy source, whereby the generator produces the non-thermal hybrid-plasma in the absence of external energy input.

2. The generator of claim 1, wherein the second container is sealed, and wherein the water disposed in the second container surrounds a portion of the sidewall of the sealed glass container.

3. The generator of claim 1, wherein the second container is sealed, and wherein the water does not substantially contact the sealed glass container.

4. The generator of claim 1, wherein the first or second end of the glass container is formed by sealing the glass container with a lid formed of at least one of glass and plastic.

5. The generator of claim 1, wherein the first end of the glass container is open, and wherein the glass container is sealed by placement or attachment of the first end of the sealed glass container upon a closed first end of the second container.

6. The generator of claim 1, wherein the second container is formed of at least one of glass and plastic.

7. A method of generating a non-thermal hybrid-plasma, the method comprising the steps of:

(a) sealing ambient air within a glass container having a first end, a second end, a sidewall, and a receiving space, wherein ambient air is sealed within the receiving space of the glass container;

(b) placing the sealed glass container within a receiving space of a second container, wherein the receiving space of the second container has a volume that is sufficiently larger than the sealed glass container;

(c) performing a step selected from:

(i) filling at least a portion of the receiving space of the second container with water and sealing the second container; or (ii) filling at least a portion of the receiving space of the second container with a sufficient volume of water so as to submerge the sealed glass container; and (d) incubating the sealed glass container within the water-filled second container for a period of time sufficient to generate the non-thermal hybrid-plasma within the sealed glass container; and wherein the method is performed and the non-thermal hybrid-plasma is generated in the absence of external energy input.

8. The method of claim 7, wherein in step (c)(i), the water disposed in the second container surrounds a portion of the sidewall of the sealed glass container.

9. The method of claim 7, wherein in step (c)(i), the water does not substantially contact the sealed glass container.

10. The method of claim 7, wherein in step (a), the first or second end of the glass container is formed by sealing the glass container with a lid formed of at least one of glass and plastic.

11. The method of claim 7, wherein the first end of the glass container is open, and wherein steps (a) and (b) are performed simultaneously such that the glass container is sealed by placement or attachment of the first end of the sealed glass container upon a closed first end of the second container.

12. The method of claim 7, wherein the second container is formed of at least one of glass and plastic.

13. The method of claim 7, further comprising the step of:

(e) removing the sealed glass container from the second container.

14. The method of claim 13, further comprising the step of:

(f) storing the sealed glass container for a period of time.

15. The method of claim 14, further comprising the step of:

(g) recovering the non-thermal hybrid-plasma.

16. A method of generating a non-thermal hybrid-plasma, the method comprising the steps of:

(a) filling at least a portion of a receiving space of a glass container with water;

(b) sealing the water within the glass container to form a sealed glass container;

(c) placing the sealed glass container within a receiving space of a second container, wherein the receiving space has a volume that is sufficiently larger than the sealed glass container;

(d) sealing the second container having the sealed glass container therewithin; and (e) incubating the water-filled, sealed glass container within the sealed second container for a period of time sufficient to generate the non-thermal hybrid-plasma within the second sealed container; and wherein the method is performed and the non-thermal hybrid-plasma is generated in the absence of external energy input.

17. The method of claim 16, wherein the second container is formed of at least one of glass and plastic.

18. The method of claim 16, further comprising the step of:

(g) recovering the non-thermal hybrid-plasma.

* * * * *